Patented Aug. 30, 1927.

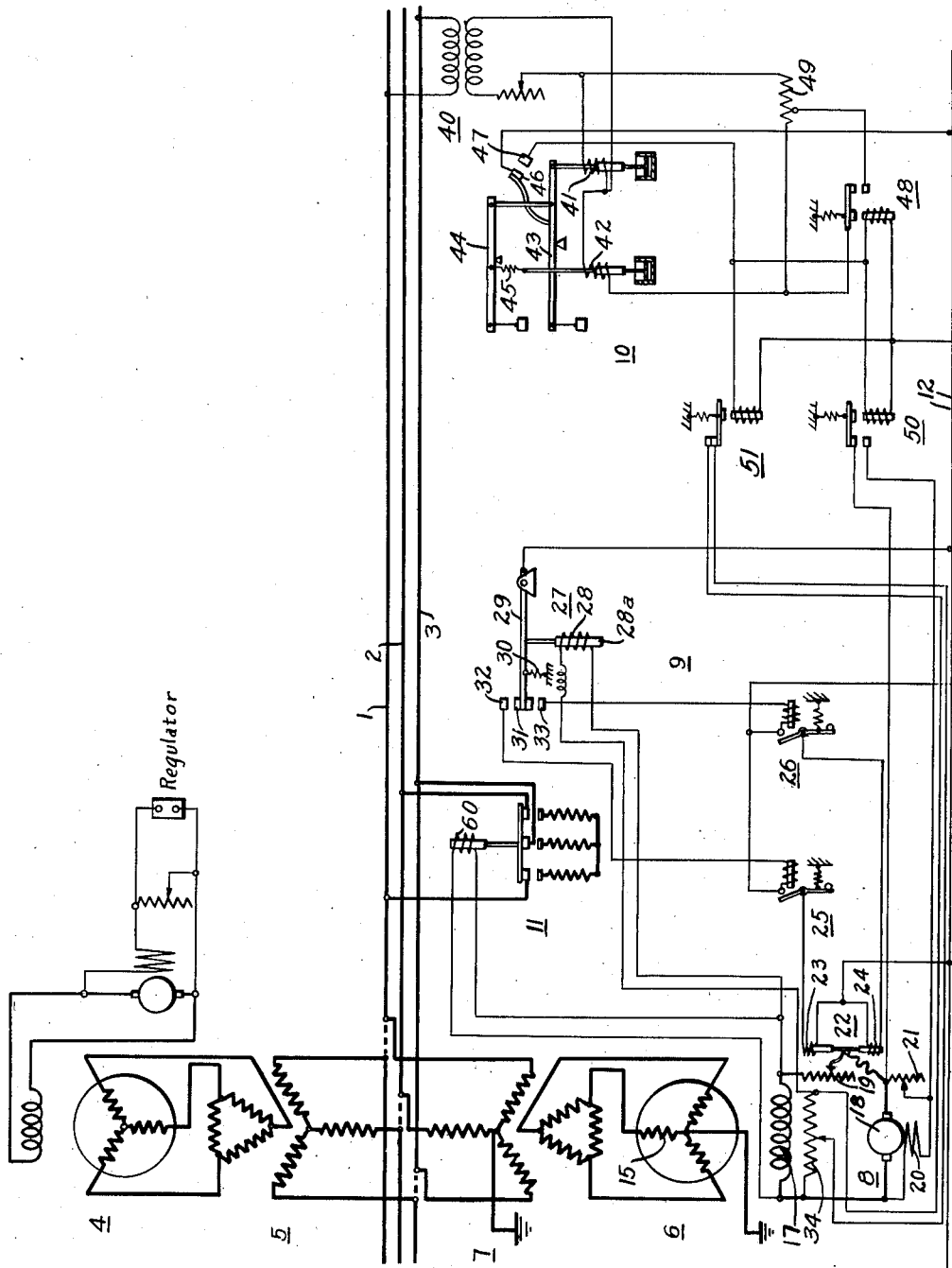

1,640,540

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed September 28, 1923. Serial No. 665,369.

My invention relates to systems of transmission, and it has special relation to means for regulating and assisting the action of synchronous condensers employed for power-transmitting purposes.

In a copending application of Frank G. Baum, Serial No. 569,704, filed June 20, 1922, is shown a system that is particularly adapted to high-voltage long-distance transmission of electrical power, this system embodying a plurality of synchronous condensers spaced along the line and adapted to provide the wattless current required in each section of the line between condenser stations, whereby a substantially constant voltage may be maintained throughout a relatively long transmission line.

One object of my invention is to provide a system embodying the principles just set forth, in conjunction with voltage-regulating means and independent inductive means for permitting the synchronous condensers to supply a relatively large amount of lagging current, when necessary to maintain the desired constant voltage of the system.

Another object of my invention is to provide a system of the above-indicated character wherein the capacity and cost of a synchronous condenser may be relatively low by reason of the condenser being adapted to provide leading currents only to the line under normal regulating conditions, a broad range regulator and an inductive device being utilized to so regulate or assist the action of the synchronous condenser as to effect the introduction of the necessary lagging current into the line when desired.

Other objects of my invention will become evident from the following detailed description, taken in conjunction with the accompanying drawing, the single figure of which is a diagrammatic view of one section of a transmission system organized in accordance with my present invention.

Referring to the drawing, the system here shown comprises a 3-phase transmission line including conductors 1, 2 and 3, a generating station 4, including a step-up transformer 5, for supplying energy to the transmission line, a synchronous condenser 6 that is connected to the transmission line through a suitable step-down transformer 7, an exciter 8, regulating devices 9 and 10 associated therewith for exciting the synchronous condenser in such manner as to maintain a substantially constant voltage upon the transmission line, a 3-phase inductive device 11 that is adapted to be connected to the transmission line, that is, across the synchronous condenser 7, under predetermined conditions hereinafter set forth, and an independent source 12 of auxiliary direct-current energy.

I desire to point out that the drawing illustrates only one section of a transmission line of the character outlined above and that a synchronous condenser 6 and the other exciting and regulating apparatus illustrated is supplied at the end of each section. Of course, the generating stations 4 are connected to the line at remotely spaced points wherever hydraulic or other sources of power may be available and, thus, the majority of the line sections and synchronous condensers are not directly connected to a generating station, but are employed to assist in transmitting the power along the line for any desired distance, as more fully set forth in the above-identified copending application of Frank G. Baum.

Each generating station 4 may be of any suitable and well-known type and no specific description thereof is deemed necessary here.

Considering the synchronous condenser substations, each condenser 6 comprises a 3-phase stator or armature winding 15 and a direct-current exciting or field-magnet winding 17, which is connected to the armature winding 18 of the exciter 8 through a variable resistor 19. A field winding 20 and a variable resistor 21 are provided for the exciter 8 in accordance with the usual practice.

The resistor 19, which is connected in series relation with the condenser field winding 17, is adapted to be automatically varied by means of a suitable motor device 22, which, for the sake of simplicity, is here shown as comprising a double-solenoid device having actuating coils 23 and 24 for operating it in the one or the other direction to thereby vary the excitation of the condenser field winding 17.

The coils 23 and 24 are respectively adapted to be energized by means of electromagnetically-operated switches 25 and 26, which are biased to the open position, as illustrated. A balanced-lever switch or regulator device 27 is, in turn, adapted to control the switches 25 and 26 and it co-operates with or supplements the action of the regulator 10 of the well-known Tirrill type. The regulator device 27 comprises a single coil 28, which is connected across the condenser field winding 17 and acts upon a core 28ª to operate a pivoted lever 29 in opposition to the action of a spring 30. Upward movement of the lever 29, upon a relatively heavy energization of the coil 28, closes a circuit between a contact member 31 of the lever 29 and a stationary contact member 32 for closing the operating circuit of the winding for switch 25, which is energized from the independent direct-current excitation circuit 12. On the other hand, downward movement of the lever 29 through the agency of the spring 30, when the energization of the coil 28 is relatively weak, effects contact between contact members 31 and 33 to energize the coil of the switch 26 for the purpose already set forth.

The regulator device 10 receives energy, in part, from the transmission line through a suitable transformer 40, which is adapted to energize the main control magnet 41 of the regulator directly and the anti-hunting or vibratory magnet 42 through a variable resistor 49. The main control magnet 41 serves to operate a floating lever 43, while the vibratory magnet 42 is adapted to actuate a bell-crank lever 44, to which it is connected by a suitable spring 45, the bell-crank lever being pivotally associated with the main floating lever 43. A movable contact member 46 is secured to the floating lever 43 and is adapted to co-operate with a stationary contact member 47.

The usual relay devices 48 and 50 are associated with the parts of the regulator just described, the actuating coils therefor being energized from the independent direct-current supply circuit 12. The relay 50, being controlled by the vibratory contact members 46 and 47, correspondingly vibrates to intermittently short-circuit the field resistor 21 for the exciter 8. The other relay 48 likewise vibrates to intermittently short-circuit the auxiliary resistor 49 that is connected in circuit with the vibratory magnet 42. Inasmuch as the parts of the Tirrill-type regulator device 10 just described are of a well-known character, no further description of the operation thereof is deemed necessary.

A third relay device 51 has its actuating coil connected in parallel relation to the actuating coils of the relays 48 and 50 and is normally closed, as illustrated, to short-circuit a portion of a resistor 34 that is connected in shunt relation to the condenser field winding 17 through the actuating coil 28 of the regulating device 27.

Since the relays 48 and 50 are energized from the independent source 12, they are not subject to fluctuations in the exciter voltage. Accordingly, the regulator mechanism 10 will function over the entire range of stable operation of the exciter 8, which is substantially from the residual voltage thereof to the maximum voltage for which the exciter is designed.

However, when it becomes necessary to impress upon the condenser field-magnet winding 17 a voltage below the residual voltage of the exciter, the supplemental regulator device 27 is utilized. This device operates in conjunction with the switches 25 and 26, and the motor device 22, to so regulate the variable resistor 19 as to reduce the excitation of the condenser field winding 17 to any desired degree, while the voltage of the exciter 8 is maintained above its residual voltage and, therefore, within the stable range of operation thereof.

The purpose of the shunt resistor 34 may be explained as follows: The regulator device 27 would function to insert the resistor 19 prior to reaching the residual voltage of the exciter if the value of the shunt resistor 34 were left unchanged. Furthermore, if the active value of the resistor 34 is properly controlled, the regulator device 27 may have an intermittent operation, thereby inserting the resistor 19 in a step-by-step manner, as desired. The relay device 51 is, therefore, provided to intermittently short-circuit the shunt resistor 34 by reason of the vibratory action of the relay, the energizing coil of which is connected across the energizing coils of the usual relays 48 and 50, as previously mentioned. In this way, the shunt resistor 34 is given a mean value in the circuit of the actuating coil 28 that is proportional to the variations in the operation of the Tirrill regulator 10. The electromagnet 28 operates against the spring 30 and, when the two exactly balance, the contact member 31 assumes the neutral position between contact members 32 and 33, as illustrated. In securing step-by-step control of the resistor 19, the necessary balance of pull is intermittently obtained by variations in the value of the resistor 34 that are caused by the reaction of the corrective movement that is applied to the operation of the Tirrell regulator.

Consequently, when a certain amount of lagging current is required to be supplied by the synchronous condenser 6 to the transmission line in order to maintain the desired constant voltage thereon, as soon as the residual voltage of the exciter 8 is approximately reached, the regulator device 27 operates to automatically increase the active value of the series resistor 19 and thus decrease the excitation of the synchronous condenser. In the meanwhile, the shunt resistor 34 is controlled as set forth above. Thus, the normal operating range of the regulator 10, that is to say, the operating range thereof that is adapted to maintain constant supply-circuit voltage between the limits of stable operation of the exciter 8, is extended by means of the illustrated supplementary apparatus to permit excitation of the condenser field winding at a voltage below that of the residual voltage of the exciter. This particular arrangement of regulator devices is not of my present invention but is fully set forth and claimed in a copending application of John H. Ashbaugh, filed March 15, 1922, Serial No. 543,834, for regulator systems, and assigned to the Westinghouse Electric & Manufacturing Company.

In addition to the operation of the regulating apparatus to permit the synchronous condenser to supply a lagging current to the transmission line, I provide the 3-phase inductive device 11, which has an actuating coil 60 connected across the condenser field winding 17. Normally, that is to say, while the condenser 6 is supplying either a leading current corresponding to over-excitation of its field winding or a relatively small or medium degree of lagging current, the inductive device 11 is open circuited, as illustrated, since the voltage across the condenser field winding 17 sufficiently energizes the actuating coil 60 to maintain the device in such open position. However, as soon as the excitation of the condenser field winding reaches a relatively low degree, corresponding to approximately the maximum effect that the variable resistor 19 is adapted to provide, the coil 60 is so weakly energized that the corresponding switch drops, or is spring-pulled, to its lower position to insert the inductive device 11 across the transmission line, that is to say, in parallel relation to the synchronous condenser. In this way, the introduction of lagging currents to the transmission line for the desired purpose is increased, or, in other words, the action of the synchronous condenser is assisted under certain conditions by the inductive device 11.

The especial utility of a combined system of the character set forth above will be evident from the following discussion. In superpower systems of the type set forth in the above-identified copending application of Frank G. Baum, under normal conditions, the lagging load or current required of the condenser stations is of short duration. If the condenser were designed of such capacity as to provide the necessary lagging current whenever required, a relatively large and expensive condenser would be required. On the other hand, by the provision of the regulating apparatus and the shunt inductive device previously described, the condenser may be of considerably cheaper design, being adapted primarily for carrying the necessary leading loads. The lagging currents that may be required are obtained partially through the operation of the illustrated regulating device, whereby the excitation of the condenser field winding is permitted to drop below the residual voltage of the exciter and, in part, through the use of the inductive device 11.

It will be understood that the above-described order of operation of the regulating apparatus and the inductive device may be reversed, if desired; that is to say, the inductive device 11 may first be connected across the transmission line when lagging currents are required to maintain the desired constant voltage, and thereafter the regulating apparatus may be adapted to function as previously described. Furthermore, if desired, the two sets of devices may evidently be designed to operate concurrently for the desired voltage-maintaining purpose.

I do not wish to be restricted to the specific circuit connections or arrangement of parts herein set forth, as various modifications thereof may be made without departing from my invention. I desire, therefore, to be limited only by the scope of the appended claims.

I claim as my invention:

1. In a transmission system, the combination with a supply circuit, of regulating means adapted to maintain a substantially constant voltage throughout the length of said supply circuit, said means comprising a synchronous dynamo-electric machine connected thereto and a regulator, a reactive device, means controlled in accordance with the amount of wattless current exchanged with said supply circuit for connecting said reactive device to said machine, and means similarly controlled for extending the normal range of effective operation of said regulator.

2. In a transmission system, the combination with a supply circuit, a synchronous dynamo-electric machine connected thereto, an exciter therefor, and a regulator adapted to maintain a substantially constant voltage upon said supply circuit, of an inductive device, means controlled in accordance with the degree of excitation of said machine for connecting said inductive device to the machine, and means similarly controlled for maintaining effective operation of said regulator and permitting relatively low excitation of said machine while maintaining the exciter voltage above the residual value thereof.

3. In a transmission system, the combination with a supply circuit, a synchronous dynamo-electric machine connected thereto, an exciter therefor, and a regulator adapted to maintain a substantially constant voltage upon said supply circuit, of means for increasing the amount of lagging current introduced into said supply circuit beyond normal capacity of said machine and regulator to concurrently maintain substantially constant voltage, said means comprising an inductive device adapted to be connected across said machine and also means for extending the normal range of effective operation of said regulator to permit a relatively low excitation of the machine while operating the exciter above the residual voltage thereof.

4. In a transmission system, the combination with a transmission line, a synchronous condenser connected thereto, an exciter therefor, and means operated in accordance with the voltage of the line and comprising an independent source of energy for governing the excitation of said exciter between substantially the residual voltage and the maximum voltage thereof, of means for impressing upon said condenser field-magnet winding voltages below the residual voltage of the exciter, and inductive means controlled by the condenser field winding voltage for assisting the action of the synchronous condenser during the period when voltages below the residual voltage of the exciter are employed.

5. In a transmission system, the combination with a transmission line, a synchronous condenser connected thereto, an exciter therefor, means operated in accordance with the voltage of the line for governing the excitation of said exciter between substantially the residual voltage and the maximum voltage thereof, said means comprising a main control electromagnet, an anti-hunting electromagnet, a pair of contact members controlled thereby, a plurality of relays governed in accordance with the operation of said contact members, and an independent source of energy for said relays, of means for impressing upon said condenser field-magnet winding voltages below the residual voltage of the exciter, said means comprising a resistor located in the excitation circuit of said condenser field-magnet winding, means for varying the effective value of said resistor, a plurality of switches adapted to control the direction of operation of said means, electromagnetic means connected across said condenser field winding and adapted to selectively control said switches, means connected in parallel relation to said relays and adapted to vary the effective value of said last-mentioned electromagnetic means, and inductive means controlled by the condenser field-winding voltage for assisting the action of the synchronous condenser during the period when voltages below the residual voltage of the exciter are employed.

6. In a transmission system, the combination with a transmission line, a dynamo-electric machine connected thereto and having a field-magnet winding, an exciter therefor, and means operated in accordance with the voltage of the line for controlling the operation of said exciter from substantially the residual voltage thereof, of means for impressing upon said field-magnet winding voltages below the residual voltage of the exciter, said means comprising a current-consuming device associated with said field winding and controlled in accordance with the energization thereof and means in circuit with said first-named means and adapted to co-operate in the control of said device, an inductive device, and means responsive to the energization of said field-magnet winding for connecting said inductive device across the transmission line.

7. In a transmission system, the combination with a power circuit, a dynamo-electric machine connected thereto, an exciter therefor, and a regulator adapted to control the excitation of said dynamo-electric machine and having a normal operating range corresponding to the stable operating range of said exciter, of means for extending the effective range of operation of said regulator comprising means for varying the value of the excitation of said machine, said means being controlled by said regulator, an inductive device, and means for connecting said device to said power circuit under predetermined conditions to supplement the action of said dynamo-electric machine.

8. In a transmission system, the combination with a power circuit, a dynamo-electric machine connected thereto and having a field-magnet winding, an exciter therefor, and a regulator adapted to control the operation of said exciter to cause said machine to maintain a predetermined substantially constant power-circuit condition, of additional means for varying the excitation of said machine, whereby said regulator will function to control said machine over a wider range than the normal operating range thereof and comprising means adapted to effect a step-by-step operation of said additional means, an inductive device, and means for connecting said device in parallel relation to said machine under predetermined operating conditions to supplement the action thereof.

9. In a transmission system, the combination with a power circuit, a synchronous condenser connected thereto, and an exciter therefor, of means for automatically regulating the elements of said system over the limits of stable operation thereof and for automatically introducing additional means for producing an effect upon said power circuit equivalent to operating beyond the limits of stable operation of said elements without affecting the ability of said regulating means to insure stable operating conditions, an inductive device, and means for automatically connecting said device to said power circuit for further extending said effect.

10. In a transmission system, the combination with a power-circuit, a synchronous condenser connected thereto and having a field-magnet winding, an exciter therefor, and regulating means whereby said exciter may impress upon said field-magnet winding voltages between the limits of its residual voltage and its maximum voltage, of means co-operating with said regulating means and adapted to produce an effect upon said power circuit equivalent to under-exciting said field-magnet winding, thereby enabling said regulating means to control said synchronous condenser over its entire range, and means operated in accordance with field-winding conditions for further extending said effect.

11. In a transmission system, the combination with a power circuit, a synchronous condenser, connected thereto, and having a field-magnet winding, an exciter therefor, and regulating means whereby said exciter may impress upon said field-magnet winding voltages between the limits of its residual voltage and its maximum voltage, of means co-operating with said regulating means and adapted to produce an effect upon said power circuit equivalent to under-exciting said field-magnet winding, thereby enabling said regulating means to control said synchronous condenser over its entire range, a reactive device, and switching means responsive to relatively low-voltage conditions of said field-magnet winding for connecting said reactive device across said condenser to further extend said effect.

In testimony whereof, I have hereunto subscribed my name this 22nd day of September 1923.

ROBERT D. EVANS.